(12) United States Patent
    Cheng

(10) Patent No.: US 11,082,592 B2
(45) Date of Patent: Aug. 3, 2021

(54) MONITORING DEVICE ASSEMBLY AND STREET LAMP INSTALLED WITH THE ASSEMBLY, MONITORING DEVICE CAPABLE OF ANGLE ADJUSTING

(71) Applicant: Zhejiang Hoolink Technology Co., Ltd., Hangzhou (CN)

(72) Inventor: Shiyou Cheng, Hangzhou (CN)

(73) Assignee: Zhejiang Hoolink Technology Co., Ltd.

( * ) Notice: Subject to any disclaimer, the term of this patent is extended or adjusted under 35 U.S.C. 154(b) by 0 days.

(21) Appl. No.: 16/857,270

(22) Filed: Apr. 24, 2020

(65) Prior Publication Data

US 2021/0120152 A1 Apr. 22, 2021

(30) Foreign Application Priority Data

Oct. 22, 2019 (CN) .......................... 201921775648.0

(51) Int. Cl.
| | |
|---|---|
| H04N 5/225 | (2006.01) |
| F21S 8/08 | (2006.01) |
| F21V 21/30 | (2006.01) |
| F21V 33/00 | (2006.01) |
| G03B 17/56 | (2021.01) |

(52) U.S. Cl.
CPC ............ *H04N 5/2253* (2013.01); *F21S 8/085* (2013.01); *F21V 21/30* (2013.01); *F21V 33/0052* (2013.01); *G03B 17/561* (2013.01); *H04N 5/2252* (2013.01)

(58) Field of Classification Search
None
See application file for complete search history.

(56) References Cited

U.S. PATENT DOCUMENTS

| | | | | | |
|---|---|---|---|---|---|
| 3,731,897 | A | * | 5/1973 | Price ...................... | F16M 13/02 248/230.1 |
| 4,514,067 | A | * | 4/1985 | Gallegos .............. | G03B 17/561 396/425 |
| 5,259,584 | A | * | 11/1993 | Wainwright ........... | F16M 11/08 248/289.11 |
| 9,678,419 | B2 | * | 6/2017 | Fan ...................... | F16M 11/2085 |
| 10,054,257 | B1 | * | 8/2018 | Snoke .................. | B66F 11/048 |
| 10,775,683 | B1 | * | 9/2020 | Hallett ................. | F16M 11/046 |
| 2008/0159733 | A1 | * | 7/2008 | Liang ................... | G03B 17/561 396/428 |

(Continued)

FOREIGN PATENT DOCUMENTS

| | | |
|---|---|---|
| CN | 107289387 A | 10/2017 |
| CN | 206682821 U | 11/2017 |
| CN | 109611748 A | 4/2019 |

*Primary Examiner* — William B Perkey
(74) *Attorney, Agent, or Firm* — Fresh IP PLC; Clifford D. Hyra; Aubrey Y. Chen

(57) ABSTRACT

The disclosure relates to the technical field of LED lamps, in particular to a monitoring device assembly and a street lamp with the assembly, and a monitoring device capable of angle adjusting and a street lamp equipped with the monitoring device. It includes a mounting bracket provided with a curved adjusting frame and a monitoring device provided with a mounting base; the curved adjusting frame is provided with an angle adjusting hole along its length direction; the mounting base is provided with an angle adjusting bolt for passing through the angle adjusting hole to connect the curved adjusting frame.

15 Claims, 11 Drawing Sheets

(56) References Cited

U.S. PATENT DOCUMENTS

| | | | |
|---|---|---|---|
| 2013/0223834 A1* | 8/2013 | Jikihara | G03B 11/045 396/448 |
| 2013/0236235 A1* | 9/2013 | Johnson, Sr. | F16M 13/00 403/53 |
| 2015/0177596 A1* | 6/2015 | Bergsten | F16M 13/022 248/205.1 |
| 2016/0097966 A1* | 4/2016 | Song | G03B 35/08 396/428 |
| 2017/0019976 A1* | 1/2017 | Rajagopalan | G01S 7/003 |
| 2017/0205686 A1* | 7/2017 | Bingleman | G03B 17/08 |

* cited by examiner

MONITORING DEVICE ASSEMBLY AND STREET LAMP INSTALLED WITH THE ASSEMBLY, MONITORING DEVICE CAPABLE OF ANGLE ADJUSTING

TECHNICAL FIELD

The disclosure relates to the technical field of LED lamps, in particular to a monitoring device assembly and a street lamp installed with the assembly, and a monitoring device capable of angle adjusting and a street lamp equipped with the monitoring device.

BACKGROUND

With the development of device and the progress of technique, monitoring devices are widely used. When monitoring device is installed, it is usually necessary to adjust the viewing angle in accordance with the installation environment. The patent with the public No. CN 208739289 U, dated Apr. 12, 2019 discloses a mounting structure of a surveillance camera that it includes a base provided with screw sleeves at the four corners of the top thereof. One end of the base is fixed with a fixing frame. Both sides of the front surface of the fixing frame are equipped with electro-magnetic chutes provided with a first fixing plate inside. The first fixing plate is slidably connected to the inside of the two sets of electromagnetic chute. By setting multiple sets of screw sleeves, the base can be installed on the wall better and faster. By setting two sets of corresponding fixing screws and curved holders, it is possible to better fix the monitoring devices installed in the fixing holes and the placement holes. However, this mounting structure is not convenient for adjusting the mounting angle of the surveillance camera.

SUMMARY

In order to solve the above technical problems, the present disclosure provides a monitoring device assembly, wherein, may include:

a mounting bracket provided with a curved adjusting frame and a monitoring device with a mounting base;

the curved adjusting frame may be provided with an angle adjusting hole along its length direction;

the mounting base may be provided with an angle adjusting bolt for passing through the angle adjusting hole to connect the curved adjusting frame.

In the above technical solution, loosening the angle adjusting bolt can enable the monitoring device to move along the angle adjusting hole, and tightening the angle adjusting bolt can fix the monitoring device in the mounting bracket, thereby the adjusting of the installation angle of the monitoring device is realized.

Preferably, the mounting bracket further includes a main frame for receiving the monitoring device; the main frame may be provided with a plurality of mounting holes, and the curved adjusting frame may be provided across the main frame. The main frame is used for the installation and fixing of the entire monitoring device assembly. The angle of the monitoring device on the mounting bracket can be adjusted by adjusting the connection position of the monitoring device and the curved adjusting frame.

Preferably, the mounting base may include a curved protrusion; and an arc of the curved protrusion is adapted to a concave arc of the curved adjusting frame. The mounting base of the monitoring device can be substantially fitted with the curved adjusting frame, so that the monitoring device can be moved along the curved adjusting frame to adjust the installation angle of the monitoring device in the mounting bracket.

Preferably, an inner concave surface of the curved adjusting frame is provided with a plurality of first racks along the length direction of the curved adjusting frame; the curved protrusions of the mounting base is provided with a plurality of second racks corresponding to the first racks. It is convenient to precisely control the adjusting accuracy of the monitoring assembly and maintain the adjusted installation angle of the monitoring device.

Preferably, a surface of the mounting base is provided with an angle adjusting scale; the curved adjusting frame is provided with an angle adjusting pointer toward the angle adjusting scale.

The disclosure also provides a street lamp, wherein, it may include said monitoring device assembly above and a street lamp body.

In the above technical solution, the street lamp using the monitoring device assembly can conveniently adjust the installation angle of the monitoring assembly.

Preferably, a street lamp joint connected to the street lamp body; and the street lamp body is provided with an angle adjusting portion for enabling the street lamp body to rotate relative to the street lamp joint; and an angle adjusting surface formed by the angle adjusting portion is consistent with the rotation plane of the street lamp body relative to the street lamp joint. The illumination angle of the street lamp can be adjusted by the angle adjusting unit to make full use of the lighting area of the street lamp. At the same time, the monitoring device assembly can make adaptive adjusting with the adjusting of the angle of the street lamp body, thereby locking the monitoring area.

Preferably, the street lamp body comprises a panel on which a lamp is installed, and the panel is provided with a monitoring assembly mounting slot for installing the monitoring device assembly; the main frame comprises a horizontal panel portion located around the monitoring assembly mounting slot and a vertical panel portion inserted into the monitoring assembly mounting slot.

Preferably, the horizontal panel portion is fixedly connected to an edge of the monitoring assembly mounting slot.

Preferably, the monitoring assembly mounting slot is provided with a lamp waterproof joint hole, and the mounting base is provided with a monitoring device waterproof joint hole. The power supply wire may pass through the lamp waterproof joint hole and the monitoring device waterproof joint hole, to electrically connect the street lamp body and the monitoring device to supply the monitoring device.

The disclosure has the following beneficial effects:

1. The angle adjusting bolts of the monitoring device assembly can be loosened so that the monitoring device can move along the angle adjusting hole. The angle adjusting bolts can be tightened, so as to fix the monitoring device in the mounting bracket to adjust the installation angle of the monitoring device.

2. The street lamp with the monitoring device assembly can adjust the illumination angle of the street lamp through the angle adjusting portion to make full use of the lighting area of the street lamp. At the same time, the monitoring device assembly can make adaptive adjusting with the adjusting of the street lamp body angle to lock the monitoring area.

In order to solve the above technical problems, the present disclosure provides a monitoring device capable of angle adjusting, wherein it includes:

a camera assembly and a fixing member for installing the camera assembly;

the camera assembly may include a camera and an upper cover for connecting with the fixing member, one end of the upper cover is movably connected with the fixing member, and the other end of the upper cover is fixed with the fixing member by an angle adjusting member;

the fixing member is provided with an angle adjusting slide, and the angle adjusting slide is provided corresponding to the angle adjusting member, so that the angle adjusting member can move along the angle adjusting slide when the upper cover rotates relative to the fixing member.

In the above technical solution, the upper cover drives the camera to rotate relative to the fixing member to adjust the installation angle of the camera. When the camera is adjusted to an appropriate position, the upper cover and the fixing member are fixed by the angle adjusting member, thereby locking the camera at the required installation angle.

Preferably, the angle adjusting slide may include an elongated angle adjusting hole provided along a rotation track of the angle adjusting member as the upper cover rotates; the angle adjusting member is an angle adjusting screw threadedly connected to the upper cover through the angle adjusting hole. The angle adjusting screw may be loosened so that the upper cover can be rotated relative to the fixing member to adjust the installation angle of the camera. And the angle adjusting screw may be tightened so that the installation angle of the camera can be locked, thereby that the adjusting of the camera installation angle will be realized.

Preferably, the upper cover may be provided with a slider corresponding to the angle adjusting slide, and a surface of the slider facing the angle adjusting slide may be provided with an angle adjusting scale. The configuration of the angle adjusting scale can better measure and record the adjusting angle, which is convenient for the assembly of the camera assembly and the adjusting of the camera installation angle.

Preferably, the upper cover may be provided with a first motor for installing the camera; the camera may be connected to a drive shaft of the first motor. The camera can be rotated relative to the upper cover with the output shaft of the first motor as an axis to adjust the monitoring angle of the camera.

Preferably, the camera may include a second motor, a probe assembly, a first gear, and a second gear; the first gear may be connected to a drive shaft of the second motor, the second gear may be connected to the probe assembly, and the first gear may be engaged with the second gear. The probe assembly can be rotated around the drive shaft of the second motor to adjust the monitoring angle of the probe.

Preferably, the camera assembly may further include a glass cover buckled on the upper cover to place the camera cover. This configuration can improve the waterproof and dustproof performance of camera assembly.

The present disclosure also provides a street lamp, wherein it may include the monitoring device capable of angle adjusting above; and a street lamp body.

In the above technical solution, the street lamp using the monitoring device can conveniently adjust the installation angle of the camera.

Preferably, it may further include a street lamp joint connected to the street lamp body; the street lamp body may be provided with an angle adjusting portion for enabling the street lamp body to rotate relative to the street lamp joint; an angle adjusting surface formed by the angle adjusting portion is consistent with a rotation plane of the upper cover fixing member. The illumination angle of the street lamp can be adjusted by the angle adjusting portion to make full use of the lighting area of the street lamp. At the same time, the camera of the monitoring device can adjust adaptively with the angle of the street lamp body to lock the monitoring area.

Preferably, the street lamp body may include a panel on which a lamp is installed, and the panel may be provided with a monitoring device mounting slot for installing the monitoring device capable of angle adjusting; the fixing member may include a horizontal panel portion located around the monitoring device mounting slot; and a vertical panel portion inserted into the monitoring device mounting slot; the horizontal panel portion may be fixedly connected to an edge of the monitoring device mounting slot.

Preferably, the monitoring device mounting slot may be provided with a lamp waterproof joint hole, and the upper cover may be provided with a monitoring device waterproof joint hole; the monitoring device waterproof joint hole may be coaxial with the drive shaft of the first motor. The power supply wire passes through the lamp waterproof joint hole and the monitoring device waterproof joint hole to electrically connect the street lamp body and the monitoring device to supply the monitoring device.

The present disclosure has the following beneficial effects:

1. The camera assembly is movably connected to the fixing member through its upper cover, so that the camera can rotate relative to the fixing member, thereby that the camera installation angle of the monitoring device can be adjusted.

2. The camera can rotate relative to the upper cover under the driving of the first motor, so that the monitoring angle of the camera can be adjusted.

3. The camera's probe assembly can be driven by the second motor to make the monitoring angle of the probe adjustable.

4. For the street lamp with the monitoring device, the illumination angle of the street lamp can be adjusted by the angle adjusting portion to make full use of the lighting area of the street lamp. At the same time, the installation angle of the camera can be adjusted adaptively with the angle of the street lamp body, thereby that a wider monitoring area will be obtained.

DETAILED DESCRIPTION OF EMBODIMENTS

The terms used herein are for the purpose of describing particular embodiments only and is not intended to limit the invention. Unless otherwise defined, all terms used herein have the same meaning as commonly understood by one of ordinary skill in the art to which this invention belongs. It will be further understood that common terms should be interpreted to have meanings consistent with their meanings in the related art and in this disclosure. This disclosure is to be considered an example of the invention and is not intended to limit the invention to specific embodiments.

Embodiment 1

Figure 1:
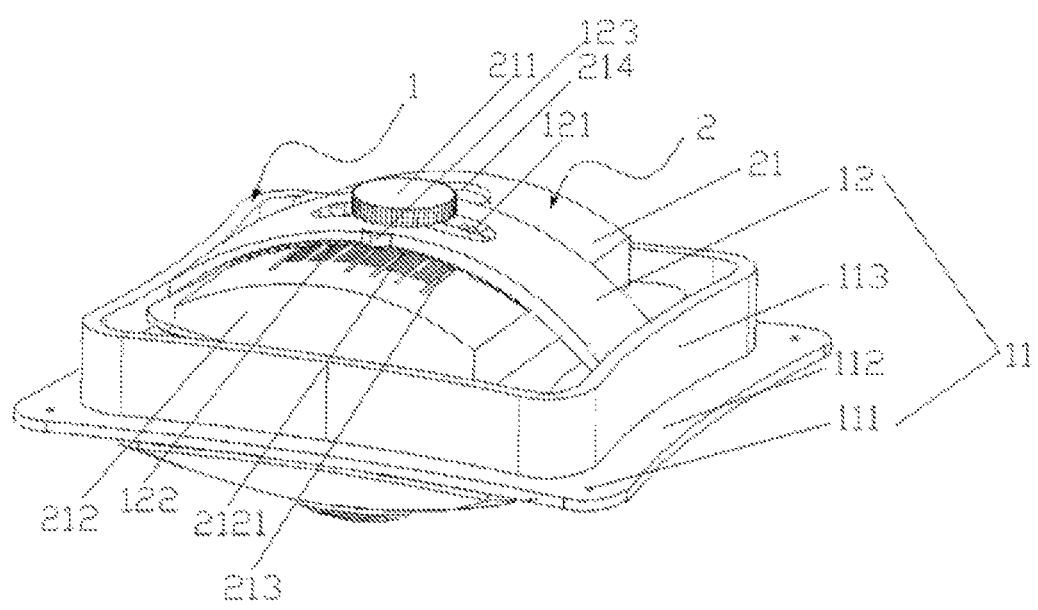
FIG. 1 is a schematic three-dimensional structure diagram of a monitoring device assembly according to the first embodiment of the present disclosure.
Figure 2:
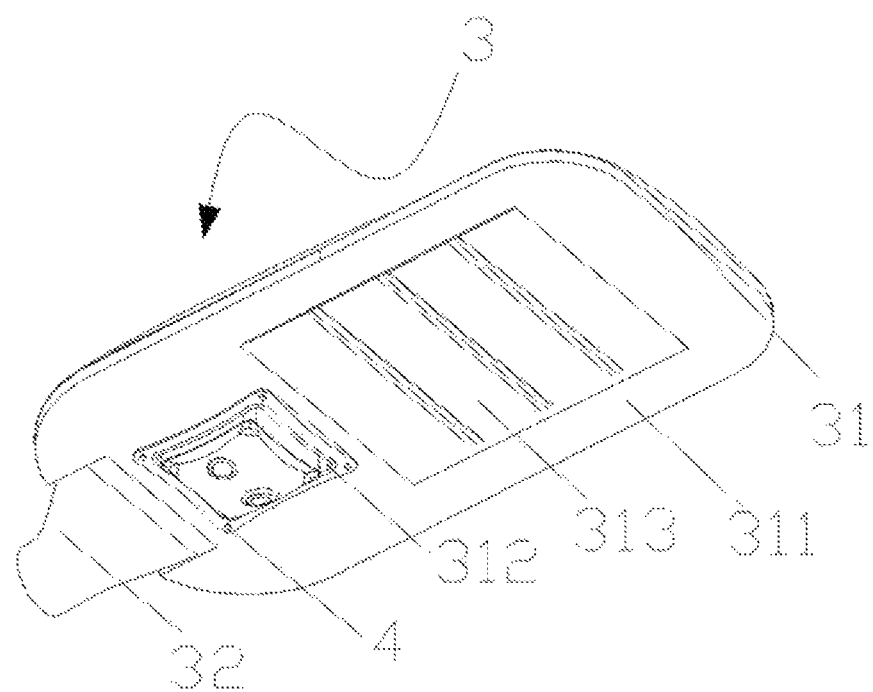
FIG. 2 is a schematic three-dimensional structure diagram of a street lamp according to the second embodiment of the present disclosure.
Figure 3:
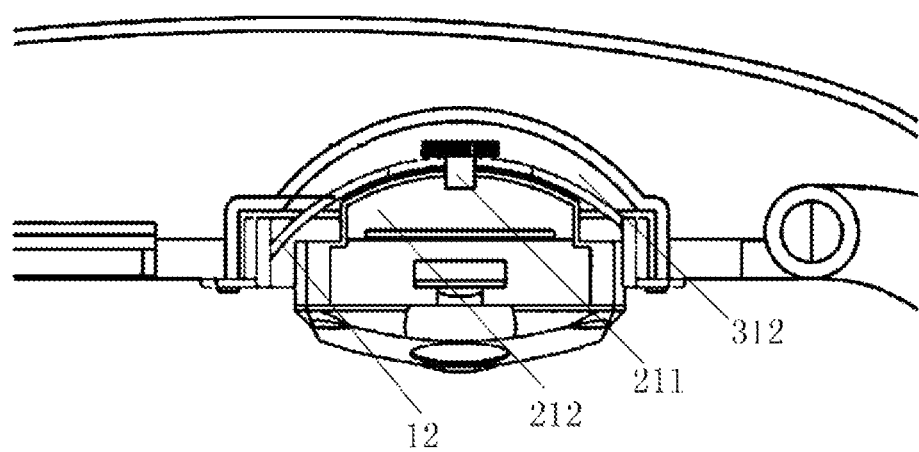
FIG. 3 is a cross-sectional view of a monitoring assembly mounting slot installed with a monitoring assembly according to the second embodiment of the present disclosure.
Figure 4:
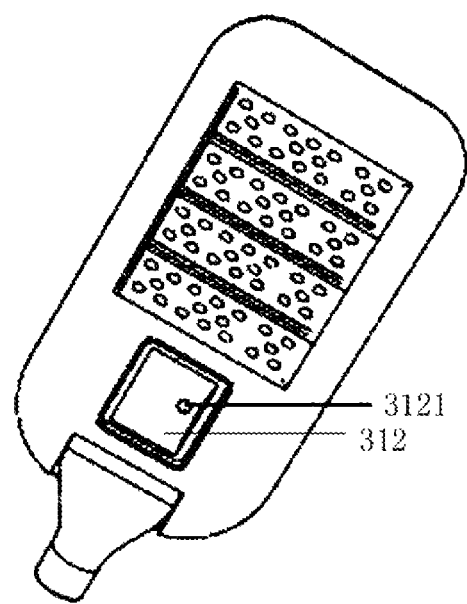
FIG. 4 is a schematic structural diagram of a street lamp (without monitoring device assembly installed) according to the second embodiment of the present disclosure.
Figure 5:
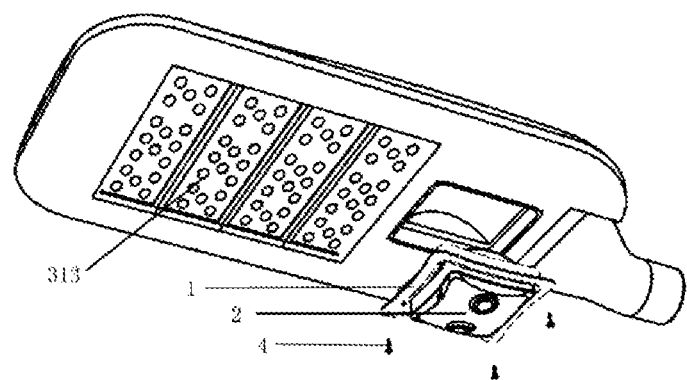
FIG. 5 is a schematic diagram of installing a monitoring device assembly according to the second embodiment of the present disclosure.
Figure 6:
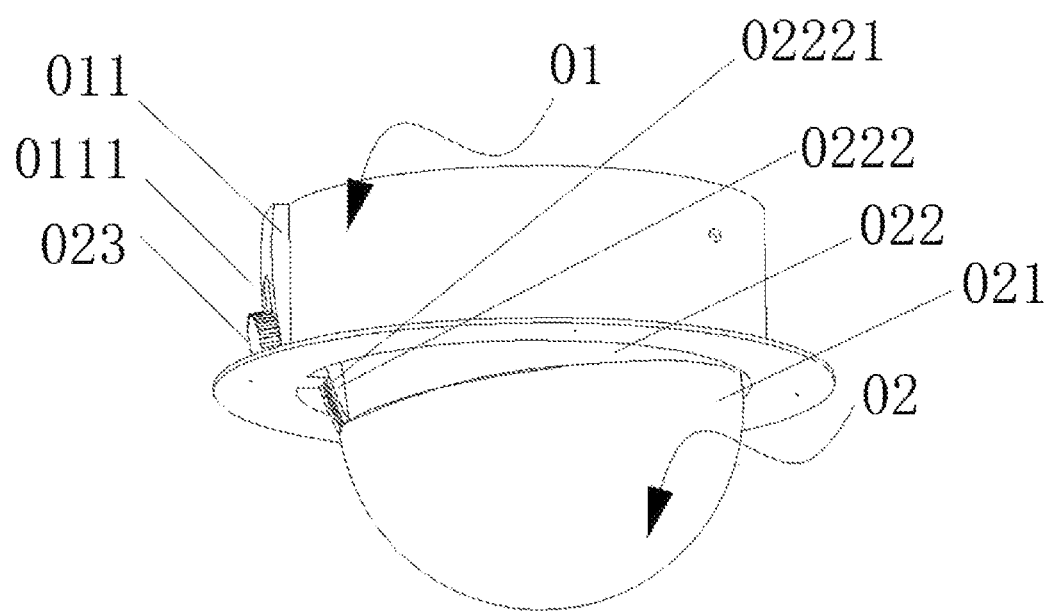
FIG. 6 is a schematic three-dimensional structure diagram of a monitoring device according to the third embodiment of the present disclosure.
Figure 7:
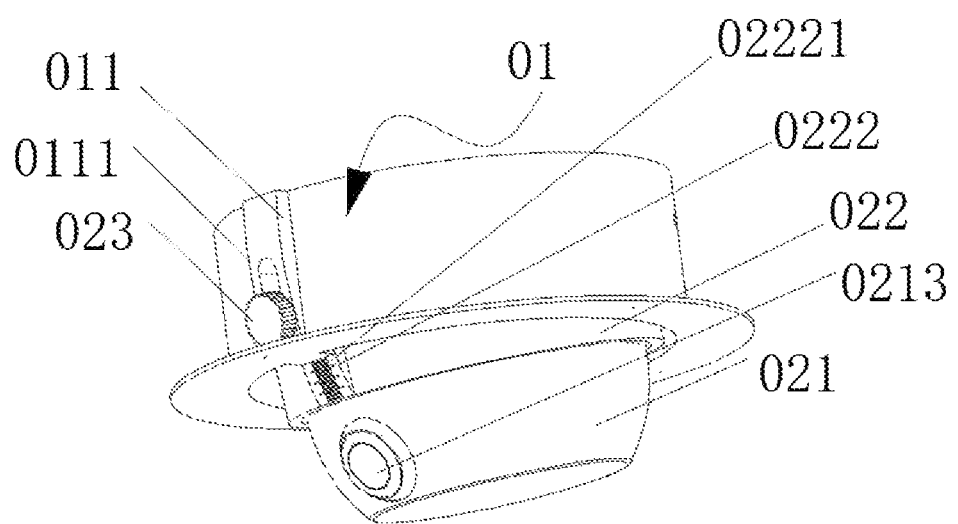
FIG. 7 is a schematic three-dimensional structure diagram of a monitoring device according to the third embodiment of the present disclosure (the glass cover is not shown).

A monitoring device assembly shown in FIG. 1 may include a mounting bracket 1 and a monitoring device 2. The mounting bracket 1 may include a main frame 11 for monitoring device and a curved adjusting frame 12 provided on the main frame 11. The main frame 11 may be provided with a plurality of mounting holes 111 for installing and fixing the entire monitoring device assembly. The curved adjusting frame 12 may cross the main frame 11 in an upwardly arched manner, and may also cross in the main frame 11 in a downwardly recessed manner. The curved adjusting frame 12 may be provided with a elongated angle adjusting hole 121 along the length direction (that is, the direction of the arc) for installing the monitoring device 2.

The monitoring device 2 can be provided with a mounting base 21 for installing and connecting with the mounting bracket 1. The mounting base 21 may be provided with an angle adjusting bolt 211, and the nut end of the angle adjusting bolt 211 is located outside the angle adjusting hole 121. The other end of the angle adjusting bolt 211 passes through the angle adjusting hole 121 and is connected to the mounting base 21, so as to install the monitoring device 2 to the curved adjusting frame 12. Preferably, the outer side of the nut end of the angle adjusting bolt may be provided with a non-slip pattern, which is convenient for tightening or loosening the angle adjusting bolt 211. Loosing the angle adjusting bolt 211 may enable the monitoring device 2 to move along the elongated angle adjusting hole 121. Tightening the angle adjusting bolt 211 can fix the monitoring device 2 on the angle adjusting frame 12, thereby fixing the monitoring device to the mounting bracket 1, in order to adjust the installation angle of the monitoring device 2.

Preferably, the curved adjusting frame 12 in one embodiment may span the main frame 11 in an upwardly arched manner, leaving more installation space for the monitoring device 2. The mounting base 21 of the monitoring device 2 may correspondingly include a curved protrusion 212, and the arc of the curved protrusion 212 is adapted to the concave arc of the curved adjusting frame 12 (that is, the arc of the curved protrusion 212 and the concave arc of the curved adjusting frame 12 are substantially the same), so that the mounting base 21 of the monitoring device 2 can be fitted tightly mounted on the curved adjusting frame 12, or after the monitoring device 2 is installed on the curved adjusting frame 12, the distance between the mounting bases 21 and the curved adjusting frame 12 can be substantially uniform, thereby ensuring that there is no interference when the monitoring device is moved along the angle adjusting hole 121. It is convenient to move the monitoring device 2 along the curved adjusting frame 12 to adjust the installation angle of the monitoring device 2 in the mounting bracket 1.

Preferably, the inner concave surface of the curved adjusting frame 12 may be provided with a plurality of first racks 122 along the length direction of the curved adjusting frame 12. In this embodiment, the angle adjusting holes 121 are provided with a row of first racks 122 at each side, and the racks of the two rows of the first racks 122 are arranged at equal intervals. A plurality of second racks 2121 corresponding to the first racks 122 are provided on the curved protrusions 212 of the mounting base 21. It is convenient to precisely control the angle adjusting accuracy of the monitoring assembly, and to maintain the adjusted installation angle of the monitoring device 2. Further, the surface of the mounting base 21 of this embodiment can be provided with an angle adjusting scale 213, and the curved adjusting frame 12 is provided with an angle adjusting pointer 123 facing the angle adjusting scale 213. The angle adjusting pointer in this embodiment is a triangular protrusion provided in an edge of the adjusting frame 12 and being pointed to the angle adjusting scale 213. The configuration of the angle adjusting pointer and the angle adjusting scale can better measure and record the adjusting angle, and facilitate the installation and adjusting of monitoring device assembly.

Embodiment 2

As shown in FIGS. 2 to 5, the present disclosure further provides a street lamp 3. It may include a street lamp body 31, a street lamp joint 32 connected to the street lamp body 31, and a monitoring device assembly according to one of the above embodiments. Due to the application of the monitoring device assembly, the street lamp can easily adjust the installation angle of the monitoring assembly.

The street lamp body 31 is provided with an angle adjusting portion for enabling the street lamp body 31 to rotate relative to the street lamp joint 32. The angle adjusting portion may be any structure capable of rotating the street lamp body 31 relative to the street lamp joint 32 in the prior art. For example, the angle adjusting portion may include two fulcrum through holes and at least two angle adjusting holes. All the angle adjusting holes are located on the trajectory with the fulcrum through holes as the origin. The two fulcrum through holes are symmetrically arranged and a rotating shaft is provided in the middle. The street lamp joint may be fixed on the rotating shaft, so that the street lamp body can rotate relative to the street lamp joint through the rotating shaft. The street lamp joint is provided with a fixing hole matching the angle adjusting hole. When adjusting the angle of the street lamp, rotating the street lamp body can align one of its angle adjusting holes with the fixing hole, and the angle adjusting hole and the fixing hole are fixed together by a fixing member.

In this embodiment, the angle adjusting surface formed by the angle adjusting portion is consistent with the rotation plane of the street lamp body 31 relative to the street lamp joint 32 (that is, the angle adjusting surface formed by the angle adjusting portion is roughly parallel to the rotation plane of the street lamp body 31 relative to the street lamp joint 32). When the illumination angle of the street lamp is adjusted by the angle adjusting portion to fully utilize the lighting area of the street lamp, the installation angle of the monitoring device in the monitoring device assembly can be adaptively adjusted as the angle of the street lamp body is adjusted, to offset the change of the installation angle of the monitoring device due to the adjusting of the street lamp body 31, thereby locking the monitoring area.

Preferably, the street lamp body 31 may include a panel 311 on which the lamp 313 is installed. The panel 311 is also provided with a monitoring assembly mounting slot 312 for installing a monitoring device assembly. The monitoring assembly mounting slot 312 is located between the lamp 313 and the angle adjusting portion. Compared with the lamp 312, the monitoring device assembly is provided at the distal end of the rotating shaft of the street lamp body 31, so that the adjusting arc of the angle adjusting hole of the monitoring device assembly does not need to be too large, and the space occupied by monitoring device assembly can be saved.

Further, the cross section of the main frame 11 in this embodiment may be L-shaped, and may include a horizontal panel portion 112 and a vertical panel portion 113 disposed substantially perpendicular to the horizontal panel portion 112. The horizontal panel portion 112 is provided with a plurality of mounting holes 111. The vertical panel portion 113 is inserted into the monitoring assembly mounting slot 312, and the horizontal panel portion 112 is placed around the notch of the monitoring assembly mounting slot 312. The mounting holes 111 in the horizontal panel portion 112 are evenly distributed around the monitoring assembly mounting slot 312. Bolts 4 are adapted to pass through the mounting holes 111 to fixedly connect the horizontal panel portion 112 and the edge of the monitoring assembly mounting slot 312 to embed the monitoring device assembly in the monitoring assembly mounting slot 312.

Preferably, the monitoring assembly mounting slot 312 is provided with a lamp waterproof joint hole 3121, and the mounting base 21 is provided with a monitoring device waterproof joint hole 214. In this embodiment, the monitoring device waterproof joint hole 214 and the angle adjusting scale 213 are located on both sides of the angle adjusting bolt 211, respectively. The power supply wire is passed through the lamp waterproof joint hole 3121 and the monitoring device waterproof joint hole 214 to electrically connect the street lamp main body 31 and the monitoring device 2 to supply the monitoring device 2.

Embodiment 3

As shown in FIGS. 6 to 7 and 9 to 11, a monitoring device may include a fixing member 01 and a camera assembly 02. The camera assembly 02 may be mounted on the fixing member 01, and the entire monitoring device can be fixed through the fixing member 01. The camera assembly 02 may include a camera 021 and an upper cover 022 for connecting with the fixing member. One end of the upper cover 022 may be movably connected with the fixing member 01. The opposite end of the upper cover 022 at the position where it is movably connected to the fixing member is fixed to the fixing member 01 through the angle adjusting member 023. In this embodiment, the fixing member 01 may be an upside-down barrel-shaped structure, and the upper cover 022 is an upside-down barrel-shaped structure that is a slightly smaller than the fixing member 01. One end of the upper cover 022 is hinged to the fixing member 01 through a rotating shaft 0221, and the other end of the upper cover 022 opposite to the hinged position of the fixing member 01 is fixed to the fixing member 01 by an angle adjusting bolt. The fixing member 01 may be provided with an angle adjusting slide 011 at a position corresponding to the angle adjusting member 023 (that is, the angle adjusting bolt in this embodiment). When the upper cover 022 rotates relative to the fixing member 01 with the rotating shaft 0221 as an axis, the angle adjusting member 023 can slide along the angle adjusting slide 011. Preferably, the angle adjusting slide 011 in this embodiment may include an elongated angle adjusting hole 0111 provided along the rotation trajectory formed when the angle adjusting member 023 follows the rotation of the upper cover 022. The threaded end of the angle adjusting bolt (that is, the angle adjusting member 023). passes through the angle adjusting hole 0111 and is threadedly connected to the corresponding screw hole provided on the upper cover 022. The width of the other end of the angle adjusting bolt is greater than the width of the angle adjusting hole, so that when the angle adjusting bolt is tightened, the upper cover 022 is fixed on the fixing member 01. When the angle adjusting bolt is loosened, the upper cover 022 is allowed to rotate relative to the fixing member 01 with the rotating shaft 0221 as an axis, and the angle adjusting bolt can move along the angle adjusting hole 0111 with the rotation of the upper cover. Preferably, the outer side of the bigger end of the angle adjusting bolt may be provided with a non-slip pattern, which is convenient for tightening or loosening the angle adjusting bolt, thereby facilitating the adjusting of the installation angle of the camera assembly by adjusting the angle of the upper cover 022 relative to the fixing member 01.

Preferably, the upper cover 022 may be provided at a position corresponding to the angle adjusting slide 011 with a slider 0222 for fitting with the angle adjusting slide 011, so as to guide and position the upper cover 022 when the upper cover 022 rotates relative to the fixing member 01. In this embodiment, the side surface of the slider 0222 facing the angle adjusting slide 011 is also provided with an angle adjusting scale 02221 for measuring and recording the adjusting angle, thereby facilitating the assembly of the monitoring device and the adjusting of the camera installation angle.

A first motor 0223 for mounting and connecting with the camera 021 is provided at the center of the upper cover 022 of the barrel-shaped structure. The camera 021 may include a connecting rod 0211, a second motor 0212, a probe assembly 0213, a first gear 0214, and a second gear 0215. The connecting rod 0211 is connected to the drive shaft of the first motor 0223, so that the entire camera 021 can be rotated by the driving of the first motor 0223. The drive shaft of the second motor 0212 is connected to the first gear 0214 for driving the first gear 0214 to rotate. The probe assembly 0213 is connected to the second gear 0215, and the second gear 0215 is meshed with the first gear 0214. When the second motor 0212 drives the second gear 0215 to rotate through the transmission of the first gear 0214, the probe assembly can rotate accordingly, thereby adjusting the monitoring angle of the probe.

Preferably, the camera assembly 02 may further include a glass cover 24 buckled on the upper cover 022 to cover the camera 021, to improve the dustproof and waterproof performance of the camera assembly.

Embodiment 4

Figure 8:
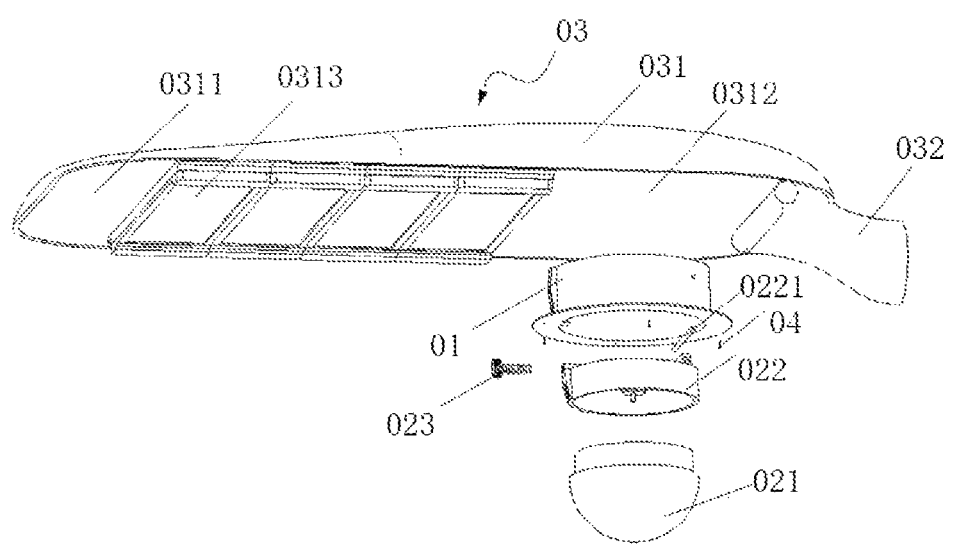
FIG. 8 is a schematic diagram of installing a street lamp according to a fourth embodiment of the present disclosure.
Figure 9:
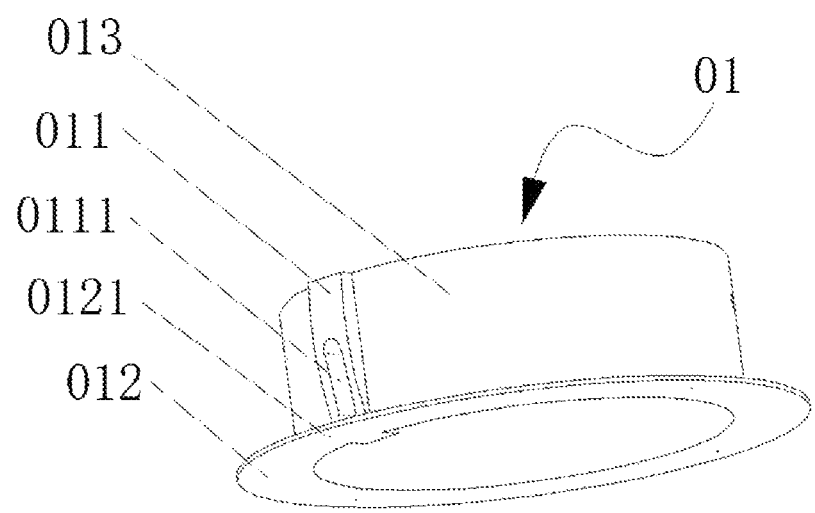
FIG. 9 is a schematic structural diagram of a fixing member according to one embodiment of the present disclosure.
Figure 10:
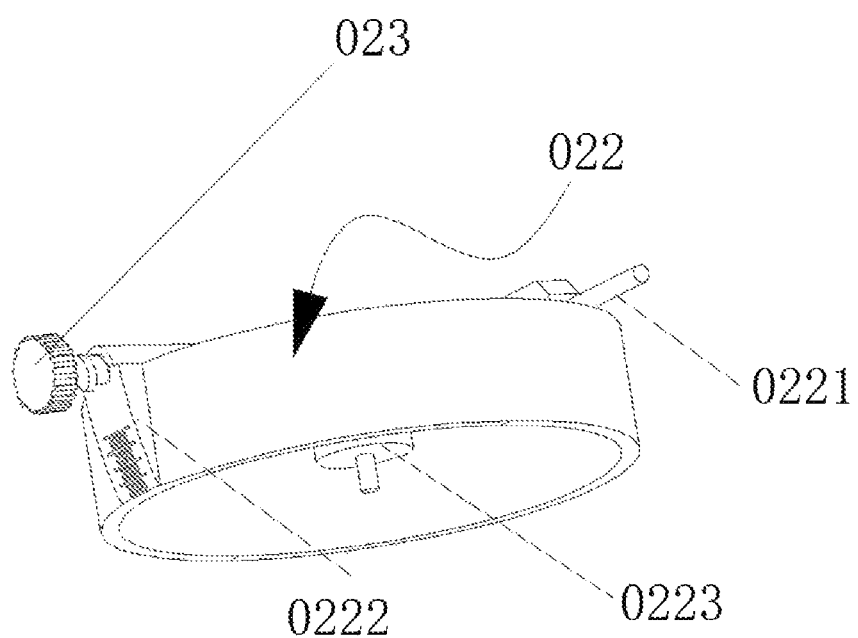
FIG. 10 is a schematic structural diagram of an upper cover according to one embodiment of the present disclosure.
Figure 11:
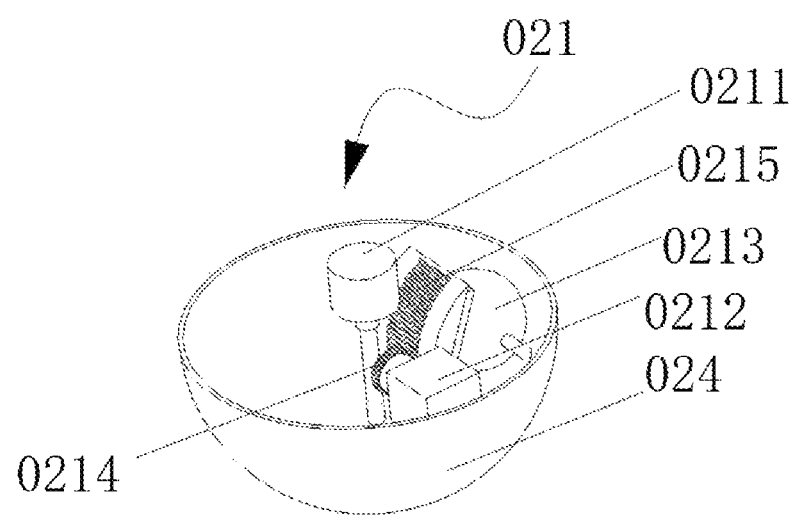
FIG. 11 is a schematic structural diagram of a camera according to one embodiment of the present disclosure.

As shown in FIG. 8, the present disclosure further provides a street lamp 03. It may include a street lamp body 031, a street lamp joint 032 connected to the street lamp body 031, and a monitoring device according to Embodiment 1. Since the monitoring device of Embodiment 1 is applied to this street lamp, the installation angle of the camera of the monitoring device can be easily adjusted.

The street lamp body 031 may be provided with an angle adjusting portion for enabling the street lamp body 031 to rotate relative to the street lamp joint 032. The angle adjusting portion may be any structure capable of rotating the street lamp body 031 relative to the street lamp joint 032 in the prior art. For example, the angle adjusting portion may include two fulcrum through holes and at least two rotation adjusting holes. All the rotation adjusting holes are located on the trajectory with the fulcrum through holes as the origin. The two fulcrum through holes are symmetrically arranged and a rotating shaft is provided in the middle. The street lamp joint may be fixed on the rotating shaft, so that the street lamp body can rotate relative to the street lamp joint through the rotating shaft. The street lamp joint is provided with a fixing hole matching the rotation adjusting hole. When adjusting the angle of the street lamp, rotating the street lamp body can align one of the rotation adjusting holes with the fixing hole, and fix the rotation adjusting hole and the fixing hole together through a fixing structure.

In this embodiment, the rotation plane of the upper cover 022 is consistent with the rotation plane of the street lamp body 031 relative to the street lamp joint 032 (ie, the rotation plane of the upper cover 022 is substantially parallel to the rotation plane of the street lamp body 031 relative to the street lamp joint 032). When the illumination angle of the street lamp is adjusted by the angle adjusting portion to fully utilize the lighting area of the street lamp, the installation angle of the camera in the monitoring device assembly can be adaptively adjusted as the angle of the street lamp body is adjusted, to offset the change of the installation angle of the camera due to the adjusting of the street lamp body 031.

Preferably, the street lamp body 031 may include a panel 0311 on which the lamp 0313 is mounted. The panel 0311 is also provided with a monitoring device mounting slot 0312 for mounting the monitoring device. The monitoring device mounting slot 0312 is located between the lamp 0313 and the angle adjusting portion. Compared with the lamp 0313, the monitoring device is provided at the distal end of the rotating shaft of the street lamp body 031, so that the adjusting arc of the angle adjusting slide of the fixing member (ie. the length of the angle adjusting hole in this embodiment) does not need to be too large, and the space occupied by monitoring device assembly can be saved.

Further, the fixing member 01 of this embodiment may include a horizontal panel portion 012 and a vertical panel portion 013 disposed substantially perpendicular to the horizontal panel portion 012. The horizontal panel portion 012 may be provided with a plurality of mounting holes 0121. The vertical panel portion 013 is inserted into the monitoring device mounting slot 0312, and the horizontal panel portion 012 is placed around the notch of the monitoring device mounting slot 0312. The mounting holes 0121 on the horizontal panel portion 012 are evenly distributed along the periphery of the monitoring device mounting slot 0312. Bolts 4 may be adapted to pass through the mounting holes 0121 to fixedly connect the horizontal panel portion 012 and the edge of the monitoring device mounting slot 0312, in order to fix the monitoring device embedding in the monitoring device mounting slot.

Preferably, the monitoring assembly mounting slot 0312 can be provided with a lamp waterproof joint hole (not shown), and the upper cover 022 can be provided with a monitoring device waterproof joint hole (not shown). The monitoring device waterproof joint hole in this embodiment is coaxial with the drive shaft of the first motor. The power supply wire can be passed through the lamp waterproof joint hole and the monitoring device waterproof joint hole to electrically connect the street lamp body 031, so as to supply the monitoring device 02.

Although the embodiments of the present disclosure have been described, those skilled in the art can make various variations or modifications within the scope of the appended claims.

The invention claimed is:

1. A monitoring device assembly, wherein comprising:
   a mounting bracket provided with a curved adjusting frame and a monitoring device provided with a mounting base;
   the curved adjusting frame is provided with an angle adjusting hole along its length direction;
   the mounting base is provided with an angle adjusting bolt for passing through the angle adjusting hole to connect the curved adjusting frame;
   wherein the mounting bracket further comprises a main frame for receiving the monitoring device; and
   wherein the main frame is provided with a plurality of mounting holes, and the curved adjusting frame is provided across the main frame.

2. The monitoring device assembly according to claim 1, wherein:
   the mounting base comprises a curved protrusion; and an arc of the curved protrusion is adapted to a concave arc of the curved adjusting frame.

3. The monitoring device assembly according to claim 2, wherein:
   an inner concave surface of the curved adjusting frame is provided with a plurality of first racks along the length direction of the curved adjusting frame;
   the curved protrusions of the mounting base is provided with a plurality of second racks corresponding to the first racks.

4. The monitoring device assembly according to claim 3, wherein:
   a surface of the mounting base is provided with an angle adjusting scale;
   the curved adjusting frame is provided with an angle adjusting pointer toward the angle adjusting scale.

5. A street lamp comprising:
   the monitoring device assembly according to claim 1 and a street lamp body.

6. The street lamp according to claim 5, further comprising:
   a street lamp joint connected to the street lamp body; and
   the street lamp body is provided with an angle adjusting portion for enabling the street lamp body to rotate relative to the street lamp joint; and
   an angle adjusting surface formed by the angle adjusting portion is consistent with the rotation plane of the street lamp body relative to the street lamp joint.

7. The street lamp according to claim 5, wherein:
   the street lamp body comprises a panel on which a lamp is installed, and the panel is provided with a monitoring assembly mounting slot for installing the monitoring device assembly;
   the main frame comprises a horizontal panel portion located around the monitoring assembly mounting slot and a vertical panel portion inserted into the monitoring assembly mounting slot.

8. The street lamp according to claim 7, wherein:
the horizontal panel portion is fixedly connected to an edge of the monitoring assembly mounting slot.

9. The street lamp according to claim 7, wherein:
the monitoring assembly mounting slot is provided with a lamp waterproof joint hole, and the mounting base is provided with a monitoring device waterproof joint hole.

10. A monitoring device capable of angle adjusting, wherein comprising:
a camera assembly and a fixing member for installing the camera assembly;
the camera assembly comprises a camera and an upper cover for connecting with the fixing member, one end of the upper cover is movably connected with the fixing member, and an other end of the upper cover is fixed with the fixing member by an angle adjusting member;
the fixing member is provided with an angle adjusting slide, and the angle adjusting slide is provided corresponding to the angle adjusting member, so that the angle adjusting member can move along the angle adjusting slide when the upper cover rotates relative to the fixing member.

11. The monitoring device capable of angle adjusting according to claim 10, wherein:
the angle adjusting slide comprises an elongated angle adjusting hole provided along a rotation track of the angle adjusting member as the upper cover rotates;
the angle adjusting member is an angle adjusting screw threadedly connected to the upper cover through the angle adjusting hole.

12. The monitoring device capable of angle adjusting according to claim 11, wherein:
the upper cover is provided with a slider corresponding to the angle adjusting slide, and a surface of the slider facing the angle adjusting slide is provided with an angle adjusting scale.

13. The monitoring device capable of angle adjusting according to claim 10, wherein:
the upper cover is provided with a first motor for installing the camera;
the camera is connected to a drive shaft of the first motor.

14. The monitoring device capable of angle adjusting according to claim 13, wherein:
the camera comprises a second motor, a probe assembly, a first gear, and a second gear;
the first gear is connected to a drive shaft of the second motor, the second gear is connected to the probe assembly, and the first gear is engaged with the second gear.

15. The monitoring device capable of angle adjusting according to claim 13, wherein:
the camera assembly further comprises a glass cover buckled on the upper cover to place the camera cover.

* * * * *